United States Patent [19]

Ström

[11] 4,400,888
[45] Aug. 30, 1983

[54] INSTRUMENT FOR LEVELLING

[76] Inventor: Yngve Ström, Furuvagen 6, 183 67 Taby, Sweden

[21] Appl. No.: 308,535

[22] PCT Filed: Jan. 23, 1981

[86] PCT No.: PCT/SE81/00018
§ 371 Date: Sep. 29, 1981
§ 102(e) Date: Sep. 29, 1981

[87] PCT Pub. No.: WO81/02200
PCT Pub. Date: Aug. 6, 1981

[30] Foreign Application Priority Data
Jan. 31, 1980 [SE] Sweden .................. 8000755

[51] Int. Cl.³ .................. G01C 15/02; G02B 5/08
[52] U.S. Cl. .................. 33/295; 350/299
[58] Field of Search .......... 33/1 G, 1 DD, 263, 286, 33/293, 295, DIG. 21, 299, 333; 350/299

[56] References Cited

U.S. PATENT DOCUMENTS

| 159,021 | 1/1875 | Davies | 33/293 |
| 405,058 | 6/1889 | Thompson | 33/293 |
| 3,382,754 | 5/1968 | Lunden | 33/263 |
| 3,473,232 | 10/1969 | Stingl | 33/295 |
| 3,528,747 | 9/1970 | Walsh | 33/293 |
| 3,598,014 | 6/1971 | Sarl | 33/295 |
| 3,634,941 | 1/1972 | Roodvoets et al. | 33/295 |
| 3,911,589 | 10/1975 | Myeress | 33/295 |
| 4,214,373 | 7/1980 | Vessey | 33/286 |
| 4,235,524 | 11/1980 | Lechter et al. | 33/299 |

FOREIGN PATENT DOCUMENTS

| 2292216 | 6/1976 | France | 33/293 |
| 992498 | 5/1965 | United Kingdom . | |
| 1211550 | 11/1970 | United Kingdom | 33/295 |

Primary Examiner—Richard R. Stearns
Attorney, Agent, or Firm—Fleit, Jacobson & Cohn

[57] ABSTRACT

An instrument for use when levelling and when laying-out right angles comprises upright mirrors (1) which intersect each other at right angles and are carried on a frame structure (2) that is adjustable relative to the horizontal plane, said mirrors having markings (4) located on the same level relative to a plane (12) which forms right angles with all mirror surfaces, thereby to enable a leveling operation or a laying-out to be carried out by a single person.

1 Claim, 4 Drawing Figures

INSTRUMENT FOR LEVELLING

The present invention relates to an instrument for use when levelling.

The object of the present invention is to provide a simple and inexpensive, but nevertheless particularly effective instrument for levelling surfaces in conjunction with various kinds of building projects, said instrument being such as to enable it to be manipulated by a single person.

To this end the instrument according to the invention is characterized in that it comprises uptight mirrors which intersect each other at right angles and are carried on a frame structure that is adjustable relative to the horizontal plane, said mirrors being provided with markings located on the same level relative to a plane which forms right angles with all mirror surfaces. This arrangement affords the advantage whereby it is possible to measure levels relative to a sighting plane determined by said markings, in all directions from the instrument without rotating the same, whereat the sighting plane can be adjusted to a horizontal position or to a position inclined to the horizontal at any desired angle, by adjusting the frame structure. Further, with the instrument positioned horizontally and one mirror plane arranged in a selected direction it is possible to lay-out right angles by sighting against one or the other vertical edge of the mirror located crosswise relative to said mirror plane.

An exemplary embodiment of the invention will now be described in more detail with reference to the accompanying drawings.

Figure 1:
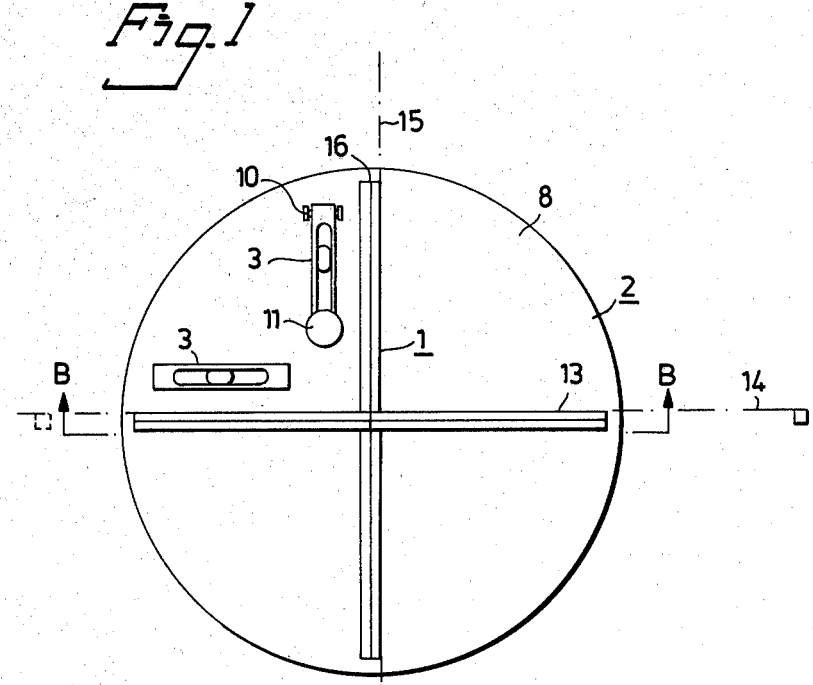
FIG. 1 is a plan view of the instrument and illustrates the mode of operation of the instrument when laying out right angles.
Figure 2:
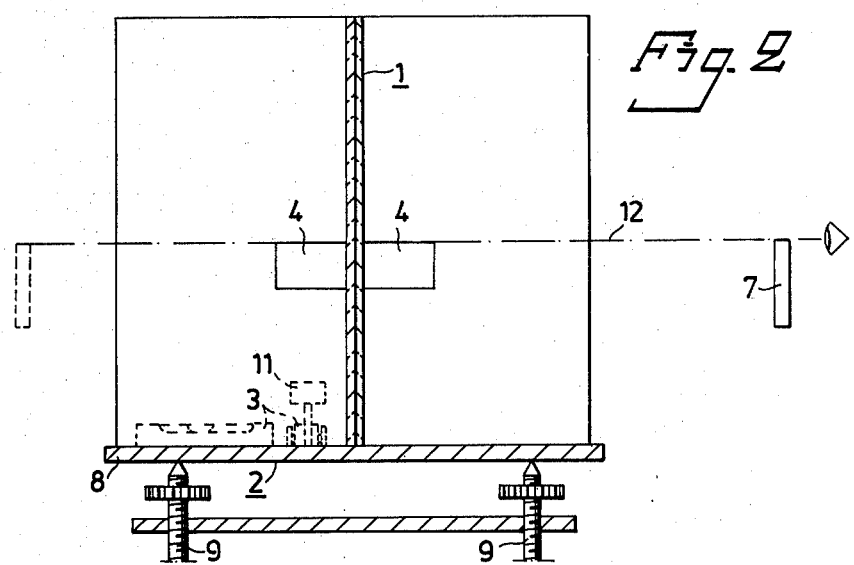
FIG. 2 is a vertical sectional view taken on the line B—B in FIG. 1, with only the upper part of the frame structure shown, said figure also illustrating the mode of operation of the instrument when levelling.

In FIGS. 1 and 2 there is generally shown at 1 an arrangement formed by mirrors which intersect each other at right angles, said arrangement being mounted on a frame structure shown generally at 2.

The frame structure 2 includes level indicators 3 which are arranged at right angles to each other on a circular plate 8, said plate being adjustable relative to the frame structure 2 in general in a conventional manner, as indicated by means of the levelling screws 9 in FIG. 2. One level indicator is pivotedly mounted at its one end as shown at 10 in FIG. 1, while the other end of said level indicator is arranged to co-act with a means 11 for inclining the level indicator relative to the plate 8 at any selected angle, so that the angle at which the plate 8, and therewith the arrangement 1, is inclined relative to the horizontal plane can be controllably adjusted when the sighting plane is to form an angle with the horizontal plane.

As will be seen from FIG. 1, the arrangement 1 includes eight mirror surfaces, and adjacent mirror surfaces form right angles with each other, so that the arrangement 1 will reflect in all directions in the sighting plane. With the aid of a marking on each mirror surface, in the illustrated embodiment said marking having the form of a dark rectangle 4, a sighting plane 12 (FIG. 2) has been established which includes the upper edge of all the rectangles 4.

Figure 3:
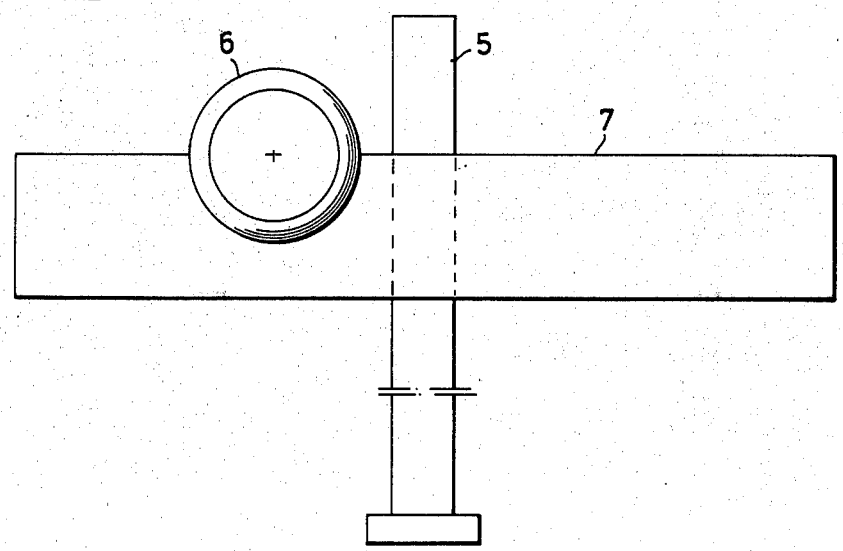
FIGS. 3 and 4 are front and side views respectively of a levelling rod suitable for use with the instrument according to the invention.
Figure 4:
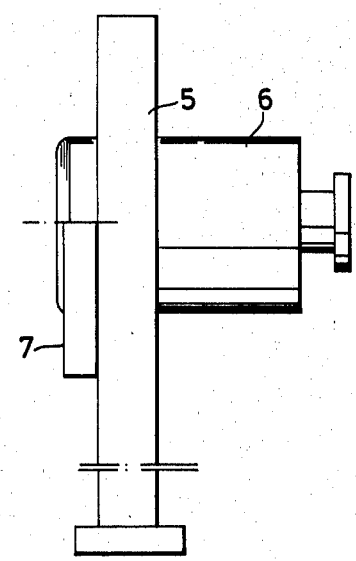

The levelling rod illustrated in FIGS. 3 and 4 includes a staff 5 and a vertically adjustable sighting plate 7 on which for the purpose of increasing the precision there is mounted a magnifying telescope device 6 or the like, said device 6 being mounted in a manner such that the sighting line of said device lies on the level of the upper edge of the plate 7. When using the levelling rod, the telescope device is sighted onto the arrangement 1 and the plate 7 is raised or lowered until said sighting line coincides with the sighting plane determined by the markings 4, said coincidence being obtained when the upper edges of the mirror image of the plate 7 and of the marking 4 coincide, whereat the established level is equal to the height of the instrument (the height up to the upper edge of the marking 4) minus the distance between the upper edge of the sighting plate 7 and the location on which the levelling rod stands.

It will be understood that such levelling can be carried out at any location whatsoever around the instrument without it being necessary to align said instrument in any particular direction, which is an important advantage. As before mentioned, the sighting plane need not be horizontal but may have an inclination set on the instrument.

The mode of operation of the instrument when using the same for laying-out right angles will be seen from FIG. 1. In this respect the arrangement 1 is positioned and adjusted in a manner such that said arrangement is located in the point of the desired angle and such that the marking 4 is located substantially in the desired sighting plane while, at the same time, one mirror surface 13 is in line with a selected line 14 which is to form one of the legs of the right angle. Each point on the other leg 15 of the right angle can then be readily determined by sighting onto the edge 16 of a mirror which forms a right angle with the mirror surface 13. Adjustment of the instrument relative to the sighting line 14 and determination of the sighting line 15 is facilitated by the reflection in the arrangement 1.

I claim:

1. An instrument for use when levelling, said instrument comprising: upright mirrors which intersect each other at right angles; a frame structure on which said mirrors are carried, said frame structure including means for adjusting said mirrors relative to the horizontal plane; said mirrors having markings defining lines located on the same level relative to a plane which forms right angles with all mirror surfaces.

* * * * *